April 29, 1952   A. M. GORDON   2,594,424
COIN CONTROLLED OSCILLATOR FOR RELAY OPERATION
Filed July 21, 1949
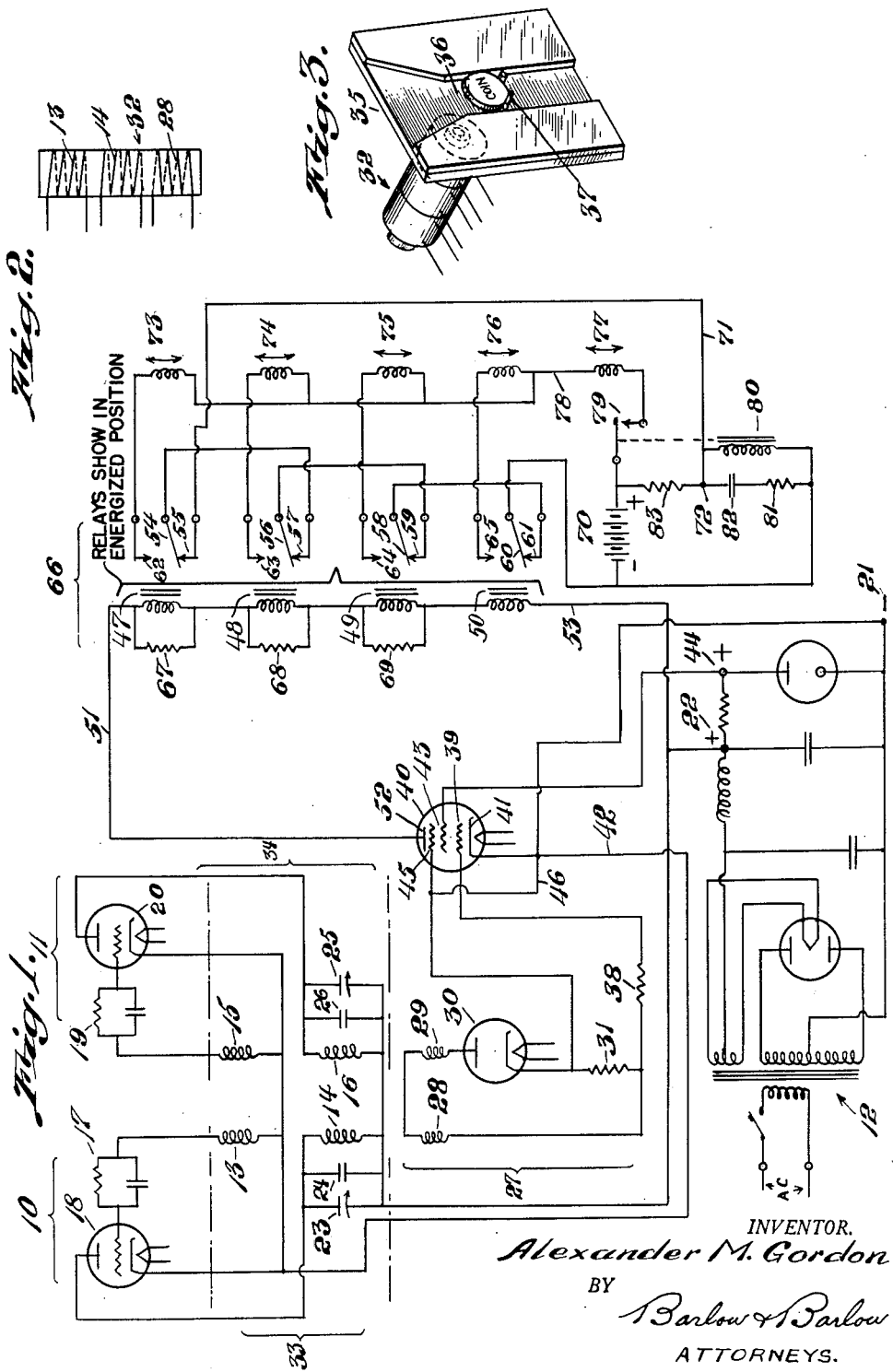
INVENTOR.
Alexander M. Gordon
BY
Barlow & Barlow
ATTORNEYS.

Patented Apr. 29, 1952

2,594,424

UNITED STATES PATENT OFFICE 2,594,424

COIN CONTROLLED OSCILLATOR FOR RELAY OPERATION

Alexander M. Gordon, Providence, R. I., assignor to Max L. Grant, Providence, R. I.

Application July 21, 1949, Serial No. 106,075

3 Claims. (Cl. 175—320)

This invention relates to an electric circuit for controlling a fare registering machine, particularly a machine of the type shown in my co-pending application, Serial No. 83,066, filed March 23, 1949.

The electric circuit shown in the above application employs a photocell for providing the electrical signal of a predetermined and constant fixed value according to the diameter of the coin passed between the photocell and its exciter lamp.

A general object of this invention is the provision of an electric circuit in which the electrical signal will be provided in accordance to the mass and composition of the particular coin to be registered.

A more specific object of this invention is the provision of an electric circuit operable to provide an electrical signal of a predetermined and constant fixed value in accordance to the mass and composition of a coin passed through the magnetic field of an oscillator coil and to increase the strength of the signal by an amplifier tube to operate relays to actuate the solenoid of a counter for registering a particular coin.

With these and other objects in view, the invention consists of certain novel features as will be more fully described and particularly pointed out in the appended claims.

In the accompanying drawings:

Figure 1 is an electrical circuit embodying my invention;

Figure 2 is a plan view of a coil assembly; and

Figure 3 is a perspective view of a coil assembly in position on one side of the coin-receiving panel, showing a coin in register axially with the coil assembly shown in Figure 2.

Referring to Figure 1, 10 and 11 indicate two identical oscillator circuits which are tuned to the same frequency range and operate from a source of conventional full wave vacuum tube rectifier power supply 12 operating from an A. C. power source. The circuits may be of a conventional design providing grid and anode windings 13 and 14 in the oscillator circuit 10 and similar grid and anode windings 15 and 16 in the oscillator circuit 11. The grid winding 13 is connected in series with a self-bias network 17 to the grid of the oscillator tube 18 and to the cathode of said tube 18. The grid winding 15 is similarly connected in series with a similar self-bias network 19 to the grid of the oscillator tube 20 and to the cathode of the said tube 20. The cathode of both oscillator tubes are connected to the negative terminal 21 of the power supply 12. One side of the anode winding 14 is connected to the anode of oscillator tube 18 and its other side to the positive terminal 22 of the power supply 12. Tuning capacitor 23 and padding capacitor 24 are connected in parallel across the anode winding 14 and similar capacitors 25 and 26 are similarly connected across the anode winding 16 of oscillator 11 resulting in identical connection for the oscillator tubes 18 and 20. The operation of the oscillator circuits in that they produce electrical oscillations at a given frequency is conventional.

The two circuits 10 and 11 are coupled by means of a link circuit 27 having a winding 28 inductively coupled to the grid and anode windings 13 and 14 of circuit 10 and a similar winding 29 inductively coupled to the grid and anode windings 15 and 16 of oscillator circuit 11. The windings 28 and 29 are wound oppositely to the said grid and anode windings and are connected in series to the plate of a diode rectifier tube 30 and in series with a diode resistor 31 to the cathode of the said tube 30. The windings 13, 14, and 15 are assembled side by side on a non-metallic core to provide a coil assembly 32 (see Fig. 2). The windings 15, 16, and 29 are similarly assembled to provide a similar coil assembly (not shown). These two coils are separated sufficiently or shielded one from the other so as to prevent an inductive coupling between the said oscillator circuits. Since the link circuit 27 is tightly coupled to both oscillator tank circuits 33 and 34, the two oscillator circuits will maintain identical frequencies.

The coil assembly 32 is positioned on one side of a non-metallic panel 35 (see Fig. 3) having a coin-receiving recess 36 on the opposite side thereof in which an abutment in the form of spaced pins 37 which are slidably mounted to be moved in and out of the path of travel of the coin to be registered and mechanically linked (not shown) to be solenoid operated. The pins are positioned to hold the said coin in the recess at a location approximately axially with the said coil 32. The presence of a coin in the magnetic field of the coil 32 changes the coil inductance, frequency is directly proportional to inductance, therefore the frequency of oscillator circuit 10 is also changed. It should be noted that the coil inductance will be changed by either the mass (size) of the coin, or by the composition of the coin or by a combination of both. Hence there is a definite value of inductance of the coil 32 for every size and composition of coin positioned over said coil 32.

This change in inductance of coil 32 causes a change in the frequency of the oscillator circuit 10, as above mentioned, and the greater the change in inductance the greater the change in frequency. The oscillator 11, which is linked to the oscillator 10 through the link circuit 27, will prevent this frequency shift by transferring the necessary reactive component of current through the link circuit 27 to compensate for the reactive (inductive reactance) change in the oscillator 10 caused by the presence of the coin in position over the coil 32. The changes in transferred current is practically linear with changes in inductance as produced by the coin in the field of the coil 32. This alternating link current flowing in the link circuit 27 is converted to a direct current by the diode rectifier tube 30 and produces a direct current voltage across the resistor 31. This signal voltage to be amplified is applied through a current limiting resistance 38 to the control grid 39 of an amplifier tube 40 (RCA type 6AC7) operated through the power supply 12.

The cathode 41 of the said tube 40 is connected through conductor 42 to the cathode of oscillator tube 18, the screen grid 43 to the positive terminal 44 of the power supply 12 and the suppressor grid element 45 thereof through conductor 46 to the negative terminal 21 of the power supply 12. The circuit herein described is adapted to operate a four coin registering machine and to this end four relays 47, 48, 49 and 50 are provided and connected in series through conductor 51 to the anode 52 of tube 40 and through conductor 53 to the positive terminal 22. Current will circulate from the power supply through the windings of the said relays and through the tube 40 to return to the power supply 12. The signal voltage or variable bias developed across resistance 31 is applied to the control grid 39 of the tube 40 in a polarity sense such that the grid 39 becomes more negative with respect to the cathode 41 with increasing current through diode 30 thereby reducing the current flow through the said tube 40 and the said relays.

Under conditions such as when there is no coin in the field of the coil 32, the tube 40 will conduct a maximum amount of current through the anode, cathode circuit, the said relays to energize to close their contacts 54, 55; 56, 57; 58, 59; and 60, 61; respectively, the contacts 62, 63, 64, and 65, respectively, of the said relays being opened. The said relays are identical and are made to operate at different values of current by means of different values of resistors 67, 68 and 69 which are connected in parallel with the coils of the said relays so as to divide the relay current between the said resistors and the coils of the said relays in inverse proportion to their resistances so that the current flow through the coils of the relays is only sufficient to hold the same energized in accordance to a predetermined current flow in the relay circuit 66. The pairs of normally closed contacts 54, 55; 56, 57; 58, 59; and 60, 61; respectively, are connected in series from the negative side of a source of potential 70 through conductor 71 to a junction point 72, thus normally short-circuiting the winding of relay 80 and providing an interlocking arrangement for these pairs of contacts of the said relays.

Each relay operates a separate solenoid for actuating a particular counter for each different coin to be registered. In the present instance, dimes, cents, nickels, and quarters are to be registered and solenoids 73, 74, 75, and 76 and which may be referred to as the dime, cent, nickel and quarter solenoid respectively, are provided for actuating the said counters (not shown) and a solenoid 77 is provided for operating and indexing the pins 37 previously referred to. Each solenoid 73, 74, 75, and 76 has one side of its winding connected to the normally opened contact of its relay and the other side of its winding connected in series through a common conductor 78 to one side of the winding of the index solenoid, the other side of which index solenoid winding is connected through the normally opened contacts 79 of a delay relay 80 to the positive of the potential 70. The winding of relay 80, shunted by a series connected resistance 81 and capacitor 82, is connected across source 70 in series with resistor 83. The winding of relay 80 is normally shorted by the closed contacts 54, 55, 56, 57, 58, 59, 60 and 61. The resistor 81 and capacitor 82 form a time circuit to delay the energizing of the relay 80.

As previously stated, the resistance 67, 68 and 69 are of different value, and the resistance 67 is of a value such that only sufficient current will flow through the winding of the relay 47 to hold it energized, the remainder of the relay circuit current being by-passed through the resistance 67. The presence of a dime in position in the magnetic field of the coil 32 will reduce, as above pointed out, the current flow through the relay circuit 66 in an amount less than that required for holding the relay 47 energized, therefore releasing the closed contacts 54, 55 of relay 47 to move to open position and closing the contacts 54, 62 to close one side of the circuit of dime solenoid 73. The reduction in relay current in the relay circuit by the presence of a dime in the magnetic field of the coil 32 is not sufficient to allow deenergizing of the coils of relays 48, 49, and 50. The opening of contacts 54 and 55 will remove the short circuit across the windings of relay 80 which will now start to energize through resistance 83, capacitor 82, and resistance 81, the values of which are chosen so as to provide a definite time delay for the complete energizing of relay 80, to close its normally opened contacts 79 to complete the circuit of the dime solenoid 73 to energize the same to actuate its counter and to also close the circuit of the solenoid 77 to operate to index or move the pins 37 to release the dime to move out of the field of the coil 32. With the coin released the entire circuit will return to normal.

With a cent in position in the field of the coil 32, the flow of relay current will be reduced sufficiently to permit both relay 47 and 48 to release the closed contacts 54, 55, and 56 and 57 and close contacts 54, 62 and 56, 63 and thereby connecting the negative side of the potential 70 to the winding of solenoid 74, and opening the circuit of the solenoid 73 at the contact 57 prior to the energizing of relay 80 to close contact 79 to complete closing of the circuits of solenoids 74 and 77 to register the cent and index the pins 37.

The registration of a nickel and quarter is performed in the same manner as above described. In registering a nickel the dime solenoid circuit is opened at contact 57, and the cent solenoid circuit at contact 59. In registering a quarter, the nickel solenoid circuit is opened at contact 61.

While a feedback type oscillator 10, 11 are shown by way of example only, it is to be understood that these may be replaced by any conventional oscillator circuit and further that amplifier tube 40 may be replaced by any type, so long as it contains a control grid. Additional modifications as the replacement of the time delay relay by mechanical types may well suggest themselves to those skilled in the art and are not to be limited except as defined in the appended claims.

I claim:

1. In a sorting device, two oscillators each having an output circuit, a rectifying device connected to said output circuits, a load resistor connected to the output of said rectifying device, means connected to said resistor responsive to changes in current therein, said means comprising a plurality of pilot relays each being responsive to a different current value, each of said pilot relays controlling a second relay, the contacts of said pilot relays being in circuit with a source of potential and the windings of said second relays and each comprising one set of make-break contacts serially arranged so that only one of said second relays is energized irrespective of the number of energized pilot relays and a time delay relay also in circuit with the windings of said second relays to delay the action of said second relays until the pilot relays have assumed a static condition.

2. In a fare registering machine, two oscillators each having an output coil inductively coupled to the oscillating circuit, a rectifying device, a load resistor, said output coils being connected in series with said rectifying device and said load resistor, a vacuum tube having at least an anode, grid and cathode, said load resistor being connected in the grid-cathode circuit of said tube, a source of potential having its positive terminal connected to said anode and its negative terminal to said cathode, a plurality of relays having their windings connected in the space current path of said tube, and each being responsive to a different current value, each of said relays controlling a second relay, the contacts of said first relays being in circuit with a source of potential and the windings of said second relays, each of said first relays comprising one set of make-break contacts serially arranged so that only one of said second relays is energized irrespective of the number of energized pilot relays, and a time delay relay also in circuit with the windings of said second relays to delay their action until the pilot relays have assumed a static condition.

3. In a fare registering machine, two oscillators each having an output coil inductively coupled to the oscillating circuit, a rectifying device, a load resistor, said output coils being connected in series with said rectifying device and said load resistor, a vacuum tube having at least an anode, grid and cathode, said load resistor being connected in the grid-cathode circuit of said tube, a source of potential having its positive terminal coupled to said anode and its negative terminal to said cathode, a plurality of relays having their windings connected in the space current path of said tube, a plurality of shunt resistors connected across said relay windings so that the effective resistance of each relay winding is of a different value, the contacts of said relays connected to operate a plurality of counter solenoids, means connected in the solenoid circuit to delay application of voltage thereto a predetermined time to allow said relays to reach a stable condition, and means for varying the bias on the grid of said tube whereby each of said relays will be operated successively as the bias changes.

ALEXANDER M. GORDON.

REFERENCES CITED

The following references are of record in the file of this patent:

UNITED STATES PATENTS

| Number | Name | Date |
| --- | --- | --- |
| 1,649,828 | Hund | Nov. 22, 1927 |
| 2,017,894 | Cady | Oct. 22, 1935 |
| 2,086,892 | Barton | July 13, 1937 |
| 2,096,881 | Butler | Oct. 26, 1937 |
| 2,123,470 | Lamb | July 12, 1938 |
| 2,295,894 | Dewan | Sept. 15, 1942 |
| 2,512,879 | Roggenstein | June 27, 1950 |
| 2,525,016 | Borell | Oct. 10, 1950 |

FOREIGN PATENTS

| Number | Country | Date |
| --- | --- | --- |
| 319,184 | Germany | Mar. 5, 1920 |

OTHER REFERENCES

"Electronic Industries," February 1946, pages 94, 95, 96 and 132.